United States Patent
Fodor et al.

(10) Patent No.: US 10,219,296 B2
(45) Date of Patent: Feb. 26, 2019

(54) DECOUPLED DOWNLINK RECEPTION AND UPLINK RECEPTION IN A MIXED LICENSED CARRIER AND UNLICENSED CARRIER WIRELESS COMMUNICATION SYSTEM

(71) Applicant: Telefonaktiebolaget LM Ericsson (publ), Stockholm (SE)

(72) Inventors: Gabor Fodor, Hässelby (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 15/521,364

(22) PCT Filed: Dec. 7, 2016

(86) PCT No.: PCT/EP2016/080081
§ 371 (c)(1),
(2) Date: Apr. 24, 2017

(87) PCT Pub. No.: WO2018/103837
PCT Pub. Date: Jun. 14, 2018

(65) Prior Publication Data
US 2018/0338320 A1 Nov. 22, 2018

(51) Int. Cl.
*H04W 72/14* (2009.01)
*H04W 16/14* (2009.01)
(Continued)

(52) U.S. Cl.
CPC ........... *H04W 72/14* (2013.01); *H04W 16/14* (2013.01); *H04W 72/1268* (2013.01);
(Continued)

(58) Field of Classification Search
CPC . H04W 76/025; H04W 72/082; H04W 72/14; H04W 16/14; H04W 72/1268;
(Continued)

(56) References Cited

U.S. PATENT DOCUMENTS

| 2014/0126497 A1* | 5/2014 | Xu ................... H04W 52/0229 370/329 |
| 2015/0003301 A1* | 1/2015 | He ........................ H04W 76/10 370/280 |

(Continued)

FOREIGN PATENT DOCUMENTS

| EP | 2608607 A2 | 6/2013 |
| GB | 2498988 A | 2/2012 |

(Continued)

OTHER PUBLICATIONS

Elbamby, Mohammed S. et al., "UL/DL Decoupled User Association in Dynamic TDD Small Cell Networks," 2015 International Symposium on Wireless Communication Systems (ISWCS), Aug. 25-28, 2015, Brussels, Belgium, IEEE, 5 pages.

(Continued)

*Primary Examiner* — Benjamin H Elliott, IV
(74) *Attorney, Agent, or Firm* — Withrow & Terranova, PLLC

(57) ABSTRACT

Systems and methods related to Downlink-Uplink Decoupling (DUDe) in mixed licensed and unlicensed carrier wireless system are disclosed. In some embodiments, a method of operating a wireless device comprises communicating with a first radio node that operates on a licensed carrier to obtain a set of time resources in which the wireless device is expected to be scheduled for uplink data transmission on the licensed carrier and/or a set of time resources in which the wireless device is expected to receive downlink control transmission on the licensed carrier. The method further comprises communicating with a second radio node that operates on an unlicensed carrier to obtain, based on the (Continued)

set(s) of time resources for the licensed carrier, a set of time resources in which the wireless device will not be scheduled for downlink reception on the unlicensed carrier and receiving a downlink transmission from the second radio node accordingly.

19 Claims, 9 Drawing Sheets

(51) Int. Cl.
    *H04W 72/12*     (2009.01)
    *H04W 84/04*     (2009.01)

(52) U.S. Cl.
    CPC ... *H04W 72/1273* (2013.01); *H04W 72/1284* (2013.01); *H04W 84/045* (2013.01)

(58) Field of Classification Search
    CPC ......... H04W 72/1273; H04W 72/1284; H04W 84/045
    See application file for complete search history.

(56) References Cited

U.S. PATENT DOCUMENTS

2015/0282204 A1    10/2015    Zhao et al.
2016/0242054 A1*    8/2016    Lee ...................... H04B 17/345
2016/0255637 A1*    9/2016    Fujishiro ............... H04W 72/12
    370/329
2017/0215082 A1*    7/2017    Hwang ................. H04W 24/08
2018/0262243 A1*    9/2018    Ashrafi ................ H04B 7/0456
2018/0270673 A1*    9/2018    Chen ..................... H04W 8/005

FOREIGN PATENT DOCUMENTS

WO    2014098914 A1    6/2014
WO    2015021318 A2    2/2015
WO    2015190844 A1    12/2015

OTHER PUBLICATIONS

International Search Report and Written Opinion for International Patent Application No. PCT/EP2016/080081, dated Sep. 11, 2017, 17 pages.

Boccardi, Federico et al., "Why to Decouple the Uplink and Downlink in Cellular Networks and How to Do It," IEEE Communications Magazine, vol. 54, Issue 3, Mar. 2016, IEEE, pp. 110-117.

\* cited by examiner

FIG. 3B

DECOUPLED DOWNLINK RECEPTION AND UPLINK RECEPTION IN A MIXED LICENSED CARRIER AND UNLICENSED CARRIER WIRELESS COMMUNICATION SYSTEM

This application is a 35 U.S.C. § 371 national phase filing of International Application No. PCT/EP2016/080081, filed Dec. 7, 2016, the disclosure of which is incorporated herein by reference in its entirety.

TECHNICAL FIELD

The present disclosure relates to Downlink-Uplink Decoupling (DUDe) in a mixed licensed carrier and unlicensed carrier wireless communication system.

BACKGROUND

Future, e.g., Fifth Generation (5G), cellular communications networks are expected to be heterogeneous, ultra-dense networks and may utilize millimeter wave (mmWave) frequencies (e.g., 1 gigahertz (GHz) up to tens of GHz or above). Downlink-Uplink Decoupling (DUDe) has been recently proposed to improve User Equipment device (UE) battery lifetimes, uplink coverage (e.g., uplink Signal-to-Interference-plus-Noise Ratio (SINR)), and data rates as well as to reduce the inter-cell interference in heterogeneous, ultra-dense and/or mmWave networks. In this respect, "uplink" refers to the direction from the UE to the network, and "downlink" refers to the direction from the network to the UE. In DUDe, different non-co-located radio access nodes serve a UE for downlink traffic and uplink traffic delivery. Furthermore, in DUDe operation, typically the radio access nodes serving the UE belong to different radio access node power classes, e.g. mixture of high power radio access nodes which may also be referred to herein as macro base stations and low power radio access nodes which may also be referred to herein as pico radio access nodes. In future cellular communications networks, when implementing DUDe, downlink and uplink traffic flows may also be routed via a mixture of licensed and unlicensed carriers, requiring different allocation criteria. For example, a UE may have a first connection to a high power node operating on a licensed carrier frequency and a second connection to a low power radio access node operating on an unlicensed carrier frequency. This means typically the downlink and uplink traffic will be served by non-co-located radio access nodes via a mixture of licensed and unlicensed carriers. Therefore, it is expected that DUDe gains in future deployments will be significant.

It is also expected that deployments of future cellular communications networks will be characterized by a mixture of user-deployed and operator-deployed radio access nodes with different power levels using frequencies ranging from below 1 GHz to tens of gigahertz (mmWave). The different radio access nodes are expected to provide services for very different types of traffic and natively support Device-to-Device (D2D) communications.

Recent studies on electromagnetic field exposure show that, in order to be compliant with applicable exposure limits at frequencies above 6 GHz, the maximum transmit power in the uplink may have to be several decibels (dB) below the power levels used for current cellular technologies. Since the transmit power has an important impact on uplink coverage, in particular for sounding over a non-precoded channel, a pragmatic approach is to use DUDe where the uplink of a UE is provided via a connection with one radio access node on a lower frequency (e.g., a carrier frequency that is less than 6 GHz) with a better link budget and a downlink of the UE is provided via a connection with another radio access node on a higher carrier frequency (e.g., a carrier frequency that is greater than or equal to 6 GHz). In other words, in a mmWave network, associating a UE to a mmWave small cell in the downlink and to a sub-6-GHz macro cell in the uplink utilizing DUDe is beneficial.

As discussed above, future cellular communications networks are expected to utilize an unlicensed frequency band or a mixture of licensed and unlicensed frequency bands. In unlicensed frequency bands, transceivers using a particular part of the band must adhere to regulations on transmitted energy, duty cycle, adjacent carrier leakage, Radio Frequency (RF) spectrum emissions, and other aspects of wireless communications. Clear Channel Assessment (CCA), Carrier Sensing (CS), and Listen-Before-Talk (LBT) are mechanisms that help transmitters to comply with regulations and ensure fair access to the wireless medium. Conversely, in frequency bands licensed to a Mobile Network Operator (MNO), the radio resource owner, that is the radio access node, can schedule wireless transmissions in uplink and downlink. Scheduled transmissions provide higher throughput at high loads than LBT based medium access protocols.

Future cellular communications systems are also expected to serve various types of UEs having different power limitations and power capabilities as well as different beam-forming capabilities. In particular, future cellular communications systems are expected to serve various UE categories. With respect to UE categories, UE capabilities differ in terms of approximate supported downlink/uplink data rate, number of multi-antenna layers (in uplink/downlink), highest Modulation and Coding Scheme (MCS) (e.g., whether 64 Quadrature Amplitude Modulation (QAM) is supported), maximum transmit power, etc. For example, UE category 8 devices support eight downlink Multiple Input Multiple Output (MIMO) layers and 64 QAM, while a category 6 device supports up to four MIMO layers and 16 QAM.

With respect to power limitations, UEs can be subject to power limitations to comply with requirements on signal quality and Out-Of-Band (OOB) emissions. These power limitations can be set by setting the Maximum Power Reduction (MPR), Additional MPR (AMPR), the so called DeltaTc, and other parameters known to those skilled in the art. In particular, since Release (Rel) 10 of the Third Generation Partnership Project (3GPP) standards suite, the Power Management MPR (P-MPR) allows a UE to reduce its maximum output power when other constraints are present. For example, multi-Radio Access Technology (RAT) terminals may have to limit the Long Term Evolution (LTE) transmission power if transmissions on another RAT are taking place simultaneously. Such power restrictions may arise, for example, from regulations on a Specific Absorption Rate (SAR) of radio energy into a user's body of OOB emissions requirements that may be affected by the Inter-Modulation (IM) products of the simultaneous radio transmissions. The P-MPR is not aggregated with MPR and A-MPR, since any reduction in a UE's maximum output power for the latter factors helps to satisfy the requirements that would have necessitated P-MPR. DeltaTc is a 1.5 dB reduction in the lower limit of the maximum output power range when the signal is within 4 megahertz (MHz) of the channel edge.

With respect to UE power capabilities, regular handheld UEs may have maximum transmit power capabilities that are different than that of low-energy sensors that send measurement data to a gateway data acquisition node in the proximity of the sensor.

Multiple antenna UEs can use transmit Beamforming (BF) to boost the uplink link budget. Transmit BF at the UE side requires that the UE estimates the uplink channel, since Channel State Information at the Transmitter (CSIT) is needed at the UE to form the uplink beam. Multiple antenna UEs typically have a limited number of antennas and limited BF capabilities as compared with that of a cellular base station. UEs with two or four transmit antennas can be regarded as typical, although in future systems high end UEs can be equipped with a greater number of transmit antennas. Likewise, multiple antenna UEs can use receive BF to boost the Signal-to-Noise Ratio (SNR) and/or SINR of the received signal, minimize the mean squared error of the received data symbols, suppress interference, or some combinations of such objectives that are well known to the skilled person.

Utilizing DUDe in a mixed licensed carrier and unlicensed carrier wireless communications system present new problems that need to be addressed. In particular, such a problem could relate to mitigating problematic transmission and/or reception scenarios at the wireless device which may result from transmission and/or reception in a mixed licensed carrier and unlicensed carrier wireless communication system.

SUMMARY

Systems and methods related to Downlink-Uplink Decoupling (DUDe) in a mixed licensed carrier and unlicensed carrier wireless communication system are disclosed. Embodiments of a method of operation of a wireless device to provide decoupling of downlink reception and uplink transmission in a mixed licensed carrier and unlicensed carrier wireless communications system are disclosed. In some embodiments, the method of operation of the wireless device comprises communicating with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency. The method further comprises communicating with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency. The method further comprises receiving a downlink data transmission from the second radio node on the second carrier frequency in a time resource that is not in the set of time resources in which the wireless device will not be scheduled for downlink reception on the second carrier frequency. In this manner, transmission and/or reception on the first and second carriers can be coordinated to mitigate problematic transmission and/or reception scenarios at the wireless device.

In some embodiments, the method further comprises deciding, based on the set of time resources in which the wireless device is expected to be scheduled for uplink data transmission on the first carrier frequency and the set of time resources in which the wireless device will not be scheduled for downlink reception on the second carrier frequency, one or more suitable time resources for uplink control transmission on the second carrier frequency. The method further comprises transmitting, subject to a Listen-Before-Talk (LBT) procedure, an uplink control transmission on the second carrier frequency in at least one of the one or more suitable time resources for uplink control transmission on the second carrier frequency.

In some embodiments, the set of time resources in which the wireless device is expected to be scheduled for uplink data transmission on the first carrier frequency is a set of subframes in which the wireless device is expected to be scheduled for uplink data transmission on the first carrier frequency, and communicating with the first radio node comprises receiving, from the first radio node, a frame number and/or a subframe number that identifies each subframe of the set of subframes in which the wireless device is expected to be scheduled for uplink data transmission on the first carrier frequency.

In some embodiments, communicating with the first radio node comprises obtaining, from the first radio node, a set of uplink precoding vectors and receive beamforming parameters expected to be used in the set of time resources in which the wireless device is expected to be scheduled for uplink data transmission on the first carrier frequency. Further, communicating with the second radio node that operates on the second carrier frequency in the unlicensed band to obtain the set of time resources in which the wireless device will not be scheduled for downlink reception on the second carrier frequency is further based on the set of uplink precoding vectors and/or receive beamforming parameters expected to be used in the set of time resources in which the wireless device is expected to be scheduled for uplink data transmission on the first carrier frequency.

In some embodiments, communicating with the second radio node that operates on the second carrier frequency in the unlicensed band to obtain the set of time resources in which the wireless device will not be scheduled for downlink reception on the second carrier frequency comprises (a) sending, to the second radio node, the set of time resources in which the wireless device is expected to be scheduled for uplink data transmission on the first carrier frequency and/or the set of time resources in which the wireless device is expected to receive downlink control transmission on the first carrier frequency and (b) receiving, from the second radio node, the set of time resources in which the wireless device will not be scheduled for downlink reception on the second carrier frequency.

In some embodiments, the method further comprises communicating with the first radio node to agree on a set of time resources in which there will be no uplink transmission from the wireless device on the second carrier frequency.

In some embodiments, the method further comprises communicating with the first radio node to agree on a set of time resources in which beamforming for uplink transmission from the wireless device on the second carrier frequency is limited.

In some embodiments, the set of time resources in which the wireless device is expected to be scheduled for uplink data transmission on the first carrier frequency is a set of subframes, a set of time slots, a set of symbols, or a set of transmission time intervals, the set of time resources in which the wireless device is expected to receive downlink control transmission on the first carrier frequency is a set of subframes, a set of time slots, a set of symbols, or a set of transmission time intervals, and/or the set of time resources in which the wireless device will not be scheduled for downlink reception on the second carrier frequency is a set of subframes, a set of time slots, a set of symbols, or a set of transmission time intervals.

In some embodiments, the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than a delay between an uplink grant and a corresponding uplink transmission on the first carrier frequency and/or the set of time resources in which the wireless device is expected to receive downlink control transmission on the first carrier frequency is a set of time resources in which the wireless device is expected to receive downlink control transmission on the first carrier frequency over a future period of time that is greater than a delay between an uplink grant and a corresponding uplink transmission on the first carrier frequency.

In some embodiments, the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than or equal to at least one radio frame and/or the set of time resources in which the wireless device is expected to receive downlink control transmission on the first carrier frequency is a set of time resources in which the wireless device is expected to receive downlink control transmission on the first carrier frequency over a future period of time that is greater than or equal to at least one radio frame.

Embodiments of a wireless device for providing decoupling of downlink reception and uplink transmission in a mixed licensed carrier and unlicensed carrier wireless communications system are also disclosed. In some embodiments, the wireless device is adapted to communicate with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency. The wireless device is further adapted to communicate with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency. The wireless device is further adapted to receive a downlink data transmission from the second radio node on the second carrier frequency in a time resource that is not in the set of time resources in which the wireless device will not be scheduled for downlink reception on the second carrier frequency.

In some embodiments, the wireless device is further adapted to operate according to any one of the embodiments of the method of operation of a wireless device disclosed herein.

In some embodiments, a wireless device for providing decoupling of downlink reception and uplink transmission in a mixed licensed carrier and unlicensed carrier wireless communications system comprises a transceiver, at least one processor, and memory. The memory comprises instructions executable by the at least one processor whereby the wireless device is operable to (a) communicate with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency, (b) communicate with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency, and (c) receive a downlink data transmission from the second radio node on the second carrier frequency in a time resource that is not in the set of time resources in which the wireless device will not be scheduled for downlink reception on the second carrier frequency.

In some embodiments, a wireless device for providing decoupling of downlink reception and uplink transmission in a mixed licensed carrier and unlicensed carrier wireless communications system comprises a first communicating module, a second communicating module, and a receiving module. The first communicating module is for communicating with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency. The second communicating module is for communicating with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency. The receiving module is for receiving a downlink data transmission from the second radio node on the second carrier frequency in a time resource that is not in the set of time resources in which the wireless device will not be scheduled for downlink reception on the second carrier frequency.

Embodiments of a method of operation of a radio node to provide decoupling of downlink reception and uplink transmission in a mixed licensed carrier and unlicensed carrier wireless communications system are also disclosed. In some embodiments, the method of operation of the radio node comprises communicating with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band. The method further comprises transmitting a downlink data transmission to the wireless device on the second carrier frequency in a time resource that is not in the set of time resources in which the wireless device will not be scheduled for downlink reception on the second carrier frequency.

In some embodiments, communicating with the wireless device comprises receiving, from the wireless device, the set of time resources in which the wireless device is expected to be scheduled for uplink data transmission on the first carrier frequency and/or the set of time resources in which the wireless device is expected to receive downlink control transmission on the first carrier frequency and sending, to the wireless device, the set of time resources in which the wireless device will not be scheduled for downlink reception on the second carrier frequency.

In some embodiments, the method further comprises communicating with the other radio node regarding time resources reserved for downlink transmission on the first carrier frequency and/or time resources reserved for downlink transmission on the second carrier frequency.

In some embodiments, the method further comprises communicating with the other radio node regarding time resources reserved for uplink transmission on the first carrier frequency and/or time resources reserved for uplink transmission on the second carrier frequency.

In some embodiments, the set of time resources in which the wireless device is expected to be scheduled for uplink data transmission on the first carrier frequency is a set of subframes, a set of time slots, a set of symbols, or a set of transmission time intervals, the set of time resources in which the wireless device is expected to receive downlink control transmission on the first carrier frequency is a set of subframes, a set of time slots, a set of symbols, or a set of transmission time intervals, and/or the set of time resources in which the wireless device will not be scheduled for downlink reception on the second carrier frequency is a set of subframes, a set of time slots, or a set of transmission time intervals.

In some embodiments, the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than a delay between an uplink grant and a corresponding uplink transmission on the first carrier frequency and/or the set of time resources in which the wireless device is expected to receive downlink control transmission on the first carrier frequency is a set of time resources in which the wireless device is expected to receive downlink control transmission on the first carrier frequency over a future period of time that is greater than a delay between an uplink grant and a corresponding uplink transmission on the first carrier frequency.

In some embodiments, the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than or equal to at least one radio frame and/or the set of time resources in which the wireless device is expected to receive downlink control transmission on the first carrier frequency is a set of time resources in which the wireless device is expected to receive downlink control transmission on the first carrier frequency over a future period of time that is greater than or equal to at least one radio frame.

Embodiments of a radio node for providing decoupling of downlink reception and uplink transmission in a mixed licensed carrier and unlicensed carrier wireless communications system are also disclosed. In some embodiments, the radio node is adapted to communicate with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band. The radio node is further adapted to transmit a downlink data transmission to the wireless device on the second carrier frequency in a time resource that is not in the set of time resources in which the wireless device will not be scheduled for downlink reception on the second carrier frequency.

In some embodiments, the radio node is further adapted to operate according to any one of the embodiments of the method of operation of a radio node disclosed herein.

In some embodiments, a radio node for providing decoupling of downlink reception and uplink transmission in a mixed licensed carrier and unlicensed carrier wireless communications system comprises at least one processor and memory. The memory comprises instructions executable by the at least one processor whereby the radio node is operable to (a) communicate with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band and (b) transmit a downlink data transmission to the wireless device on the second carrier frequency in a time resource that is not in the set of time resources in which the wireless device will not be scheduled for downlink reception on the second carrier frequency.

In some embodiments, a radio node for providing decoupling of downlink reception and uplink transmission in a mixed licensed carrier and unlicensed carrier wireless communications system comprises a communicating module and a transmitting module. The communicating module is for communicating with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band. The transmitting module is for transmitting a downlink data transmission to the wireless device on the second carrier frequency in a time resource that is not in the set of time resources in which the wireless device will not be scheduled for downlink reception on the second carrier frequency.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 3A and 3B illustrate one example of the process of FIGS. 2A through 2C;

DETAILED DESCRIPTION

Figure 1:
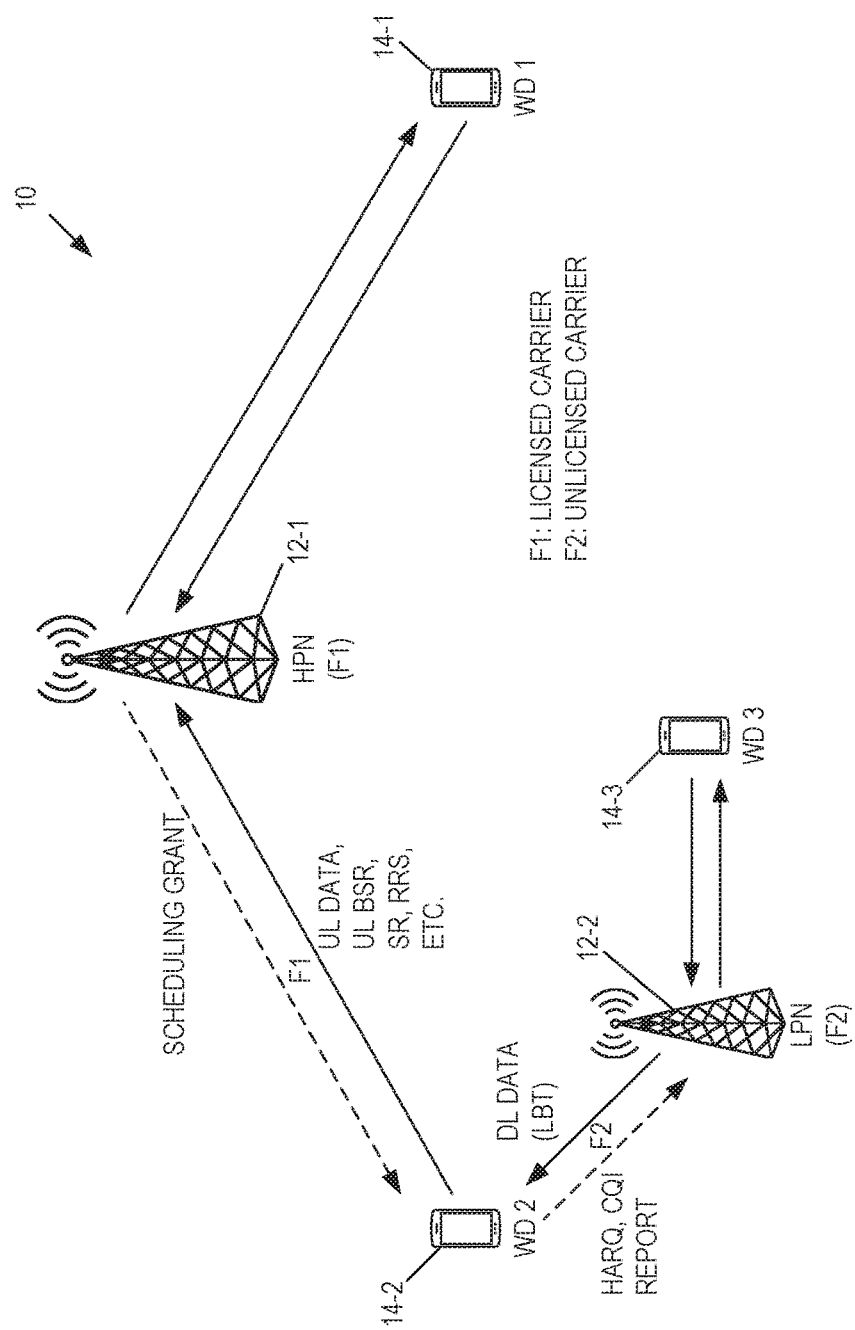
FIG. 1 illustrates one example of a cellular, or more generally wireless, communication system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an evolved Node B (eNB) in a Third Generation Partnership Project (3GPP) Long Term Evolution (LTE) network or a Base Transceiver Station (BTS) in a 3GPP Global System for Mobile Communications (GSM) network or a Node B (NB) in a 3GPP Universal Mobile Telecommunications System (UMTS) network), a high-power or macro base station, a low-power base station (e.g., a micro base station, a pico base station, a home eNB, or the like), a relay node, an access point, a wireless access point, a Transmission Point (TP), a Transmission Node (TN), a Remote Radio Unit (RRU), a Remote Radio Head (RRH), nodes in a Distributed Antenna System (DAS), a radio network controller, a base station controller, or the like.

Wireless Device: As used herein, a "wireless device" is any type of device that has access to (i.e., is served by) a wireless communications network by wirelessly transmitting and/or receiving signals to a radio access node(s). Some examples of a wireless device include, but are not limited to, a User Equipment device (UE) in a 3GPP network, a Machine Type Communication (MTC) device which is also known as a Machine-to-Machine (M2M) device, a Device-to-Device (D2D) device capable of D2D operation, a Personal Digital Assistant (PDA), a tablet, a Laptop Embedded Equipment (LEE), a Laptop Mounted Equipment (LME), a Universal Serial Bus (USB) dongle, or the like.

Time Resource: As used herein, a "time resource" is any type of physical resource or radio resource expressed in terms of length of time. Examples of a time resource are a symbol, a time slot, a subframe, a radio frame, a Transmit Time Interval (TTI), an interleaving time, or the like.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Systems and methods relating to Downlink-Uplink Decoupling (DUDe) in a mixed licensed carrier and unlicensed carrier wireless communications system are disclosed. In general, systems and methods are disclosed herein for coordinating or managing transmission and/or reception to mitigate problematic transmission and/or reception scenarios at the wireless device.

In this regard, FIG. 1 illustrates one example of a wireless communications system 10 in which embodiments of the present disclosure may be implemented. As an example, the wireless communications system 10 may be a cellular communications system. As illustrated, the wireless communications system 10 includes a heterogeneous deployment of a radio access network, which includes a number of radio access nodes. These radio access nodes are types of radio nodes. In this example, the radio access nodes include a High Power Node (HPN) 12-1 and a Low Power Node (LPN) 12-2. The HPN 12-1 and the LPN 12-2. Thus, the HPN 12-1 may also be referred to herein as a high power radio access node, high power base station, or a high power radio node, and the LPN 12-2 may also be referred to herein as a low power radio access node, a low power base station, or a low power radio node. In this example, the HPN 12-1 operates on a first carrier frequency (F1) that is in a licensed frequency band, and the LPN 12-2 operates on a second carrier frequency (F2) that is in an unlicensed frequency band. Thus, the first carrier frequency (F1) is also referred to herein as a licensed carrier, and the second carrier frequency (F2) is also referred to herein as an unlicensed carrier. In some embodiments, the second carrier frequency (F2) is a millimeter wave (mmWave) frequency (e.g., >1 gigahertz (GHz)) and, even more preferably, is greater than or equal to 6 GHz. Further, in some embodiments, the wireless communications system 10 is a 5G or similar cellular communications system utilizing beamforming, particularly, but not limited to, the uplink and downlink for the LPN 12-2. Also note that the HPN 12-1 and the LPN 12-2 may not be controlled by the same network operator.

The HPN 12-1 and the LPN 12-2 provide radio access for a number of wireless devices 14-1, 14-2, and 14-3. In this particular example, the wireless device 14-2 uses DUDe and associates with the HPN 12-1 (e.g., a macro base station) for its uplink data transmissions and with the LPN 12-2 (e.g., a pico base station) for its downlink data receptions. For uplink data transmissions to the HPN 12-1, there may be no or limited transmit beamforming gain due to, e.g., a limited number of transmit antennas at the wireless device 14-2 and limited Channel State Information at the Transmitter (CSIT) at the wireless device 14-2. Conversely, there may be high beamforming gain in the downlink from the LPN 12-2 due to, e.g., a large number of transmit antennas at the LPN 12-2 and CSIT at the LPN 12-2. Note that the wireless device 12-2 must transmit control signaling and/or reference signals to the LPN 12-2 to facilitate the downlink beamforming at the LPN 12-2. Such control signaling may include uplink reference signals, uplink Channel Quality Indication (CQI) reports, measurement reports, or control signals related to hybrid Automatic Repeat Request (HARQ) signals. These signals are transmitted in the unlicensed band on the unlicensed carrier (F2).

The wireless device 14-2 uses a licensed carrier (F1) to transmit data in the uplink, with, e.g., up to 24 decibel-milliwatts (dBm) uplink transmit power in some embodiments, to the HPN 12-1. Conversely, the LPN 12-2 uses unlicensed band, e.g. Industrial, Scientific, and Medical (ISM) or higher frequency bands, to transmit to the wireless device 14-2 in the downlink. Note that the wireless device 14-2 receives downlink control signaling and reference signals from the HPN 12-1 on the licensed carrier (F1). Such signals may include uplink scheduling grants, reference signals that facilitate measurements at the wireless device 14-2, and signals related to HARQ processes. In particular, in the embodiments described herein, the licensed carrier (F1) and the unlicensed carrier (F2) are both Time Division Duplexing (TDD) carriers. On F1, the wireless device 14-2 can also receive control information (e.g., scheduling grant) from the HPN 12-1. On F2, the wireless device 14-2 can also transmit control information (e.g., HARQ, CQI report, etc.) to the LPN 12-2. The purpose of the regular reports is to inform the LPN 12-2 when the wireless device 14-2 will be transmitting on F1. The regular reports may be periodic (e.g., triggered by periodic traffic) or aperiodic (e.g., triggered by sudden arrival of traffic or bursty traffic).

The deployment of FIG. 1 is suitable in, e.g., hotspots where there is a need to boost the downlink capacity to serve many wireless devices 14 downloading content, streaming video, etc. In such hotspots, deploying LPNs 12-2 equipped with multiple antennas operating in mmWave spectrum and supporting multi-user Multiple Input Multiple Output (MU-MIMO) transmission modes is an efficient way of boosting the overall downlink capacity of the system.

In this embodiment, the wireless device 14-2 receives scheduling grants for uplink data transmissions on the licensed carrier (F1). Conversely, since the LPN 12-2 operates on the unlicensed carrier (F2), the LPN 12-2 uses a Listen-Before-Talk (LBT) procedure before the LPN 12-2 transmits downlink data on the unlicensed carrier (F2). In some embodiments, the wireless device 14-2 may use up to 24 dBm transmit power on the licensed carrier (F1) when transmitting in the uplink. Further, in some embodiments, the transmit power on the unlicensed carrier (F2) is constrained by regulations on the unlicensed carrier (F2) to be significantly less than 24 dBm (e.g., 20 dBm in the 2.4 GHz WiFi/ISM band). The exact constraint on the transmit power on the unlicensed carrier (F2) may depend on the specific frequency band, regional regulatory aspects, operator policy, and/or device power limitations and capabilities.

In some embodiments, the wireless device 14-2 is equipped with a limited number (e.g., typically four or less) of transmit/receive antennas.

In some embodiments, the following constraints and assumptions apply:
The wireless device 14-2 is power and precoding limited due to, e.g., the wireless device 14-2 being a low power device, the wireless device 14-2 operating in cell coverage, the wireless device 14-2 transmitting at a high data rate, and/or the like. Being precoding limited implies that the wireless device 14-2 can use only certain precoding weights on its transmit antennas. In particular, the wireless device 14-2 cannot form narrow beams towards both the HPN 12-1 and the LPN 12-2 at the same time due to the limited number of antennas at the wireless device 14-2, limited capability to obtain CSIT towards both the HPN 12-1 and the LPN 12-2, and/or due to the overall power constraint. As an example, if the wireless device 14-2 is equipped with four transmit antennas, the wireless device 14-2 can use 2-2 transmit antennas to transmit to both the HPN 12-1 and the LPN 12-2 at the same time. This power and precoding limitation is referred to herein as Constraint C1. and/or The wireless device 14-2 is capability limited such that:
The wireless device 14-2 cannot simultaneously beamform or transmit uplink data on the licensed carrier (F1) and HARQ/CQI data on the unlicensed carrier (F2). This is referred to herein as Constraint C2. or The wireless device 14-2 can simultaneously beamform and transmit on the licensed carrier (F1) and the unlicensed carrier (F2) but with restricted beams (in terms of how narrow these beams are, that is with restrictions on what precoding weights are applied) and restricted transport format and/or low data rate. This is referred to herein as Constraint C3.

In some embodiments, the additional constraints and assumptions apply:
The wireless device 14-2 autonomously decides when to transmit on the unlicensed carrier (F2), depending on when the wireless device 14-2 receives downlink data from the serving LPN 12-2. This is referred to herein as Assumption A1.

The wireless device 14-2 must transmit in granted (i.e., scheduled) time slots and frequency resources on the licensed carrier (F1) uplink to its serving HPN 12-1.

In the scenario of FIG. 1, under the above constraints and assumptions, the following problems arise. First, simultaneous transmission on the licensed carrier (F1) and the unlicensed carrier (F2) causes problems at the wireless device 14-2 due to Constraint C1, Constraint C2, and Constraint C3. In particular, if the wireless device 14-2 is scheduled for simultaneous uplink transmission on both the licensed carrier (F1) and the unlicensed carrier (F2), the wireless device 14-2 has limited transmit beamforming capabilities. Second, simultaneous reception at the wireless device 14-2 on the licensed carrier (F1) and the unlicensed carrier (F2) causes problems at the wireless device 14-2 due to the capability limitations of the wireless device 14-2. In particular, if the wireless device 14-2 is scheduled for simultaneous downlink reception on both the licensed carrier (F1) and the unlicensed carrier (F2), the wireless device 14-2 has limited receive beamforming capabilities. Third, simultaneous uplink data transmission on the licensed carrier (F1) and downlink data reception on the unlicensed carrier (F2) causes various problems at the wireless device 14-2 such as, e.g., a protocol problem, a radio frequency and antenna problem, and a baseband problem. With respect to the protocol problem, when the wireless device 14-2 is receiving payload data in the downlink, the wireless device 14-2 uses protocols both in the radio layers and higher layers (e.g., TCP/IP) that require that the wireless device 14-2 sends protocol messages to maintain a bidirectional control plane (e.g., related to reference signals, measurement reporting, etc.) and ACK/NACK or other feedback (e.g., TCP messages). Thus, when the wireless device 14-2 is engaged in uplink transmission on F1, the wireless device 14-2 may not be able to comply with the downlink reception protocols because these also require the wireless device 14-2 to occasionally transmit on the uplink on F2. With respect to the radio frequency and antenna problem, when the wireless device 14-2 is receiving on F2, the wireless device 14-2 may not be able to use the same physical antennas for transmission on the uplink for F1. This is because, in case of simultaneous transmission and reception even if separated in frequency, the separation of the wireless device's own transmitted signals from the received signals is required. This separation is possible, but some wireless devices may not have this capability in order to, e.g., save cost and hardware complexity. With respect to the baseband problem, similar to the radio frequency and antenna problem, simultaneous reception and transmission imposes signal processing requirements in the baseband part of the wireless device 14-2 as well. Note that the above problems are only examples.

System and methods are disclosed herein by which the aforementioned problems can be addressed. In particular, systems and methods are disclosed that mitigate the risk of occurrence of a problematic simultaneous transmission and/or reception scenario on the licensed carrier (F1) and the unlicensed carrier (F2) when the wireless device 14-2 is operating to provide DUDe between the HPN 12-1 and the LPN 12-2. Note that the HPN 12-1 and the LPN 12-2 are only examples. The wireless device 14-2 may operate to provide DUDe between any two radio access nodes in any suitable manner (e.g., between two HPNs, between two LPNs, between the HPN 12-1 and the LPN 12-2 where the uplink is associated with the HPN 12-1 and the downlink is associated with the LPN 12-2, or between the HPN 12-1 and the LPN 12-2 where the downlink is associated with HPN 12-1 and the uplink is associated with the LPN 12-2).

Embodiments of the present disclosure are based on recognizing the interdependency of uplink scheduling and the transmit beamforming procedure on F1 and F2, as well as downlink reception and receive beamforming by the wireless device 14-2 on F1 and F2. According to some embodiments, the wireless device 14-2 and a radio access node (e.g., the HPN 12-1 or the LPN 12-2) employ procedures that reduce the risk for a conflict between the radio access node controlled scheduling and/or beamforming and wireless device autonomous transmission, precoding, and/or beamforming. Also, similar procedures are applied to avoid conflicts between receive beamforming at the wireless device 14-2 when the wireless device 14-2 receives data or control signaling from multiple radio access nodes (e.g., the HPN 12-1 and the LPN 12-2) that is inherent in DUDe deployments.

The embodiments described herein provide numerous advantages over conventional technology, as will be appreciated by one of skill in the art upon reading this disclosure. For example, one advantage of embodiments disclosed herein is that it enables a wireless device (e.g., the wireless device 14-2) with a limited number of transmit and/or receive antennas to efficiently use its multi-antenna capabilities both for transmit beamforming (e.g., uplink precoding) or receive beamforming (e.g., using advanced multi-antenna receiver capabilities). For example, by means of embodiments disclosed herein, a wireless device (e.g., the wireless device 14-2) in a DUDe network can utilize all of its transmit antennas to do narrow beamforming with respect to both the HPN 12-1 and the LPN 12-2, while existing schemes would force the wireless device to share its capabilities between the HPN 12-1 and the LPN 12-2.

Embodiments disclosed herein are particularly advantageous for a wireless device operating with at least one carrier at very high frequency (e.g., mmWave). In this case, embodiments disclosed herein enable the wireless device to transmit using a very narrow beam requiring large number of antennas on the high frequency and with reduced transmit power. This, in turn, enhances coverage and also enables battery saving at the wireless device.

Figure 2A:
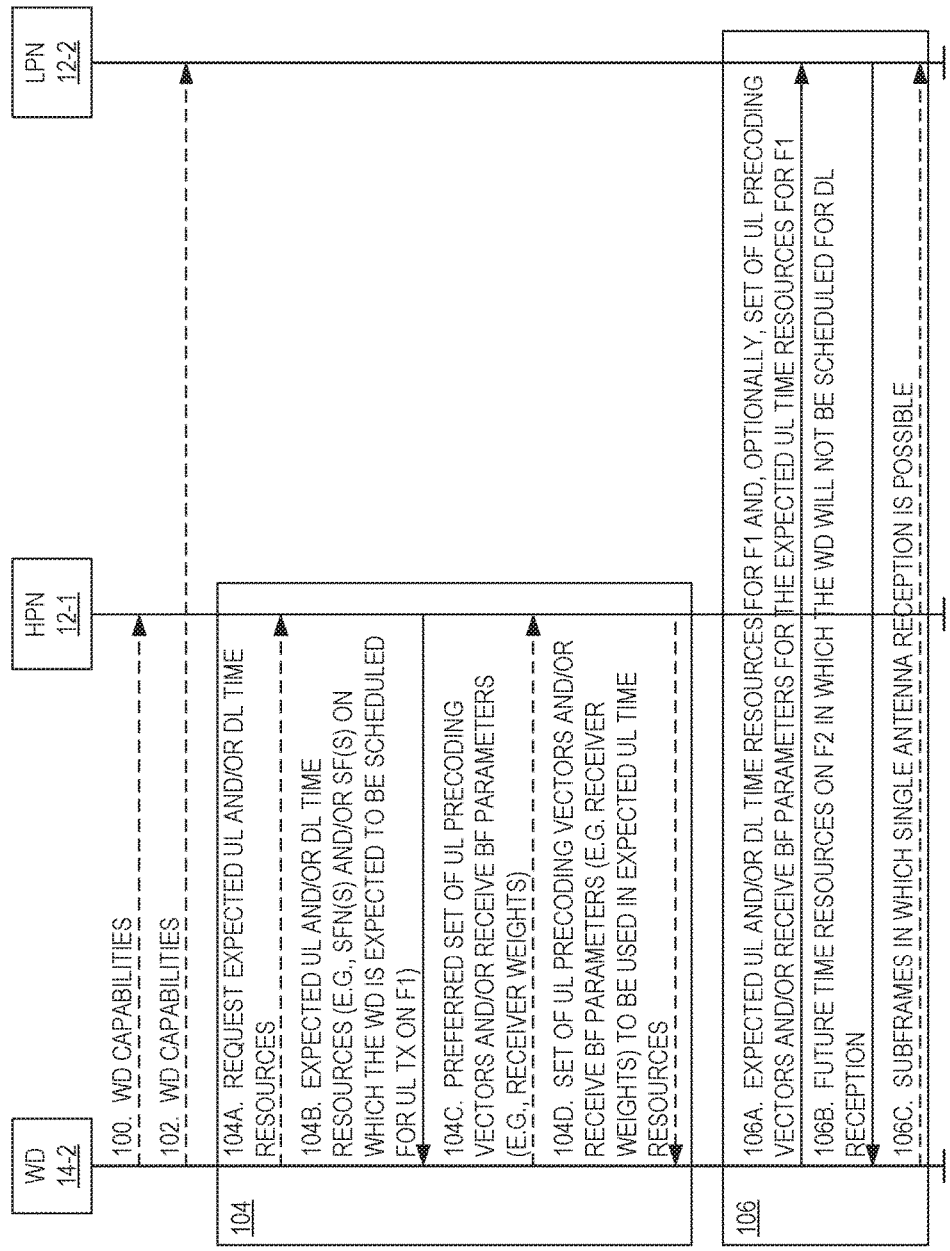
FIGS. 2A through 2C illustrate the operation of the wireless system of FIG. 1 according to some embodiments of the present disclosure.
Figure 2B:
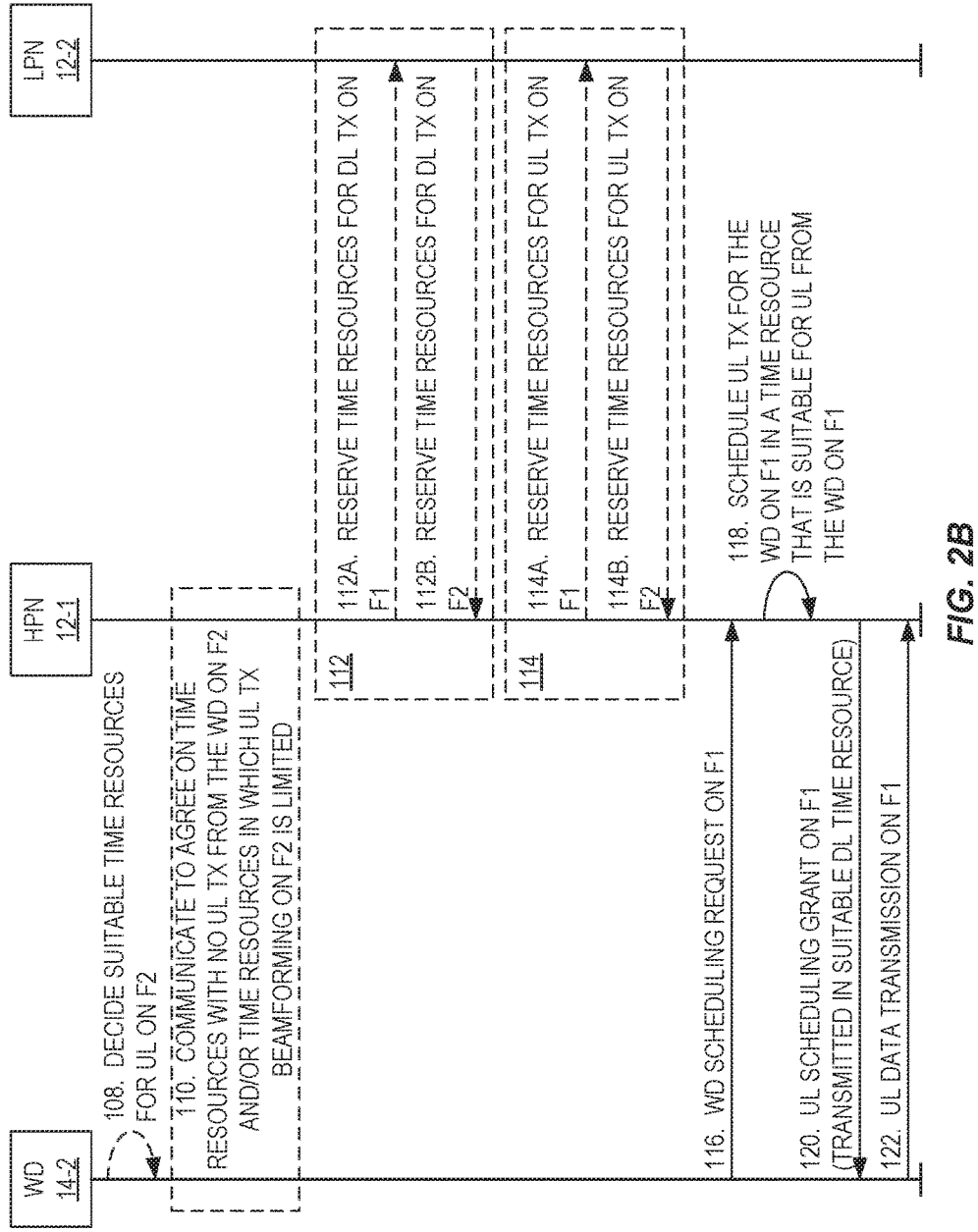
Figure 2C:
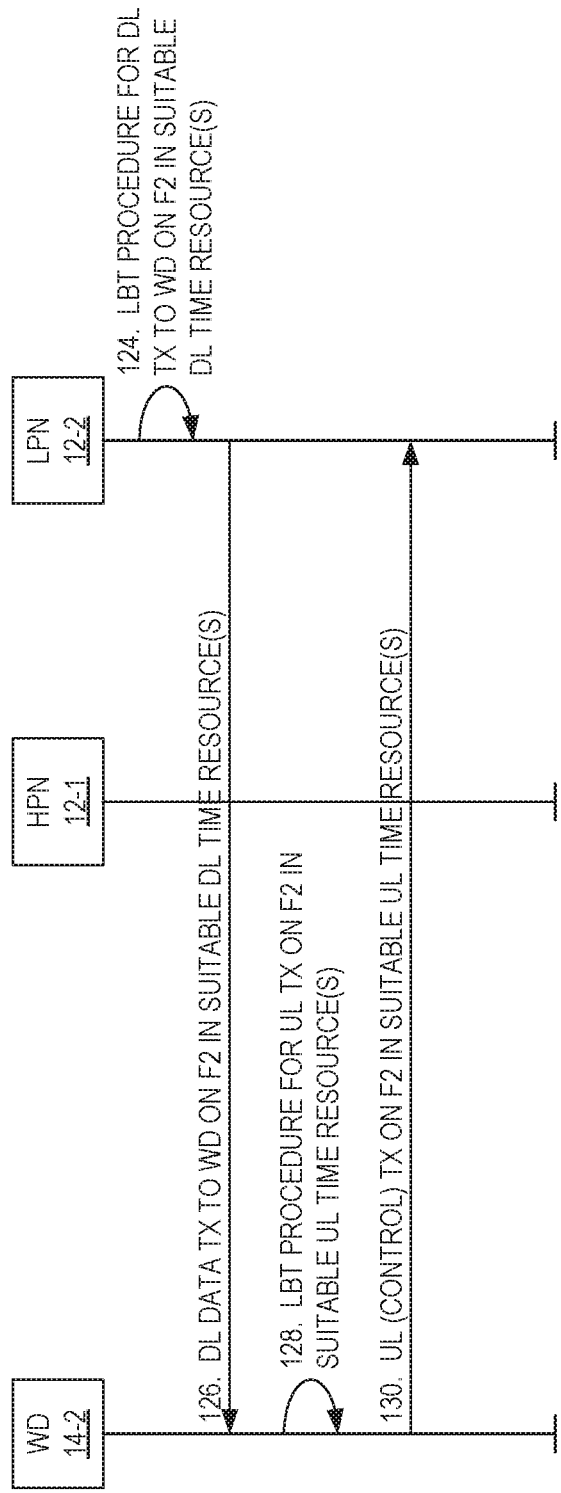

FIGS. 2A through 2C illustrate the operation of the wireless device 14-2, the HPN 12-1, and the LPN 12-2 according to some embodiments of the present disclosure. Note that optional steps are illustrated with dashed lines. Also note that while the various actions are referred to herein as steps, these actions may be performed in any order until explicitly stated or otherwise required.

As illustrated, the wireless device 14-2 optionally sends its wireless device, or UE, capabilities to the HPN 12-1 and/or the LPN 12-2 (steps 100 and 102). The wireless device capabilities may include any information regarding the capabilities of the wireless device 14-2 for simultaneous transmission and/or reception on the licensed carrier (F1) and the unlicensed carrier (F2). For example, the wireless device capabilities may directly or indirectly indicate which transmit and/or receive scenarios are or are not supported by the wireless device 14-2. For instance, the wireless device capabilities may indicate that the wireless device 14-2 does not support simultaneous uplink transmission on F1 and F2, does not support simultaneous downlink reception on F1 and F2, and does not support simultaneous uplink transmission on F1 and downlink reception on F2.

The wireless device 14-2 communicates with the HPN 12-1 to obtain a set of time resources (e.g., radio frames, subframes, symbols, time slots, TTIs, interleaving times, or the like) in which the wireless device 14-2 is expected to transmit uplink data on F1 and/or a set of time resources (e.g., radio frames, subframes, symbols, time slots, TTIs, interleaving times, or the like) in which the wireless device 14-2 is expected to receive downlink control information on F1 (step 104). In step 104, the wireless device 14-2 may optionally also obtain a set of uplink precoding vectors and/or receive beamforming parameters, also known as combining vectors, for the expected uplink and/or downlink time resources, respectively. Notably, as used herein, an "expected" uplink time resource is a time resource in which the HPN 12-1 expects to schedule the wireless device 14-2 for uplink data transmission over a defined amount of time in the future (e.g., over at least one radio frame or over the next N milliseconds (ms), where N>4 ms and could potentially be tens of ms or hundreds of ms). Thus, the set of time resources in which the wireless device 14-2 is expected to transmit uplink data on F1 is to be distinguished from a set of time resources in which the wireless device 14-2 is actually scheduled for uplink transmission via, e.g., an uplink scheduling grant. Further, defined amount of time in the future is, in general, greater than the normal time delay between a conventional uplink grant and the corresponding uplink transmission, which in 3GPP LTE is 4 ms. In the same manner, an "expected" downlink time resource is a time resource in which the HPN 12-1 expects to schedule a downlink transmission to the wireless device 14-2 over a defined amount of time in the future (e.g., over at least one radio frame or over the next M ms, where M>1 ms and could potentially be tens of ms or hundreds of ms). Step 104 may be performed aperiodically (e.g., in response to a trigger), periodically, or otherwise repeated over time in any suitable manner in order to update the expected uplink and/or downlink time resources for the wireless device 14-2 on F1 and, optionally, the set of uplink precoding vectors and/or receive beamforming parameters.

In this particular example, in order to communicate with the HPN 12-1 to obtain the aforementioned information, the wireless device 14-2 optionally sends a request to the HPN 12-1 for the set of expected uplink time resources and/or the set of expected downlink time resources for the wireless device 12-1 (step 104A). The HPN 12-1 receives the request (optional) and sends the set of expected uplink time resources and/or the set of expected downlink time resources to the wireless device 14-2 (step 104B). As an example, the expected uplink time resources and/or the set of expected downlink time resources may be indicated by frame numbers (e.g., System Frame Numbers (SFNs)) and/or subframe numbers. Notably, in this step, the HPN 12-1 sends information indicating the set of expected uplink subframes and/or the set of expected downlink subframes for the wireless device 14-2.

Optionally, the wireless device 14-2 sends a preferred set of uplink precoding vectors and/or receive beamforming parameters (e.g., receiver weights) to the HPN 12-1 (step 104C) and, in response, receives a set of uplink precoding vectors and/or receive beamforming parameters expected to be used in the expected uplink and/or downlink subframes for the wireless device 14-2 on F1 (step 104D).

The wireless device 14-2 communicates with the LPN 12-2 to agree upon or otherwise obtain, based on the set of expected uplink time resources and/or the set of expected downlink time resources for the wireless device 14-2 on F1, a set of time resources (e.g., radio frames, subframes, symbols, time slots, TTIs, interleaving times, or the like) on F2 in which the wireless device 14-2 will not be scheduled for downlink reception on F2 (step 106). More specifically, in the illustrated example, the wireless device 14-2 sends, to the LPN 12-2, the set of expected uplink time resources and/or the set of expected downlink time resources for the wireless device 14-2 on F1 (step 106A). In some embodiments, the wireless device 14-2 repeats step 106A, e.g., periodically in order to update the LPN 12-2 as to the time resources in which the wireless device 14-2 is expected to transmit on the uplink on F1 and/or the time resources in which the wireless device 14-2 is expected to receive on the downlink on F1. Optionally, in step 106A, the wireless device 14-2 may also send the set of uplink precoding vectors and/or receive beamforming parameters obtained in steps 104C and 104D to the LPN 12-2.

The information sent from the wireless device 14-2 to the LPN 12-2 in step 106A may contain exact or relatively more precise timing information (e.g., slot level, subframe level, TTI, TTI level, etc.) or a coarse timing information (e.g., frame level). The coarse level timing description is particularly applicable when the wireless device 14-2 reports data that is acquired with some periodicity (e.g., the wireless device 14-2 is a sensor node with periodic measurements (e.g., temperature, humidity, air pollution, industrial data, air pressure, etc.) or when the wireless device 14-2 transmits periodic traffic (e.g., voice). These (e.g., regular) updates sent from the wireless device 14-2 to the LPN 12-2 in step 106A can also contain information about the set of possible precoding vectors and/or set of transmit antennas that the wireless device 14-2 will use when transmitting to the HPN 12-1 on F1. For example, the wireless device 14-2 can know in advance that it will use two transmit antennas for upcoming transmissions on F1. The wireless device 14-2 determines the set of transmit antennas based on, e.g., its capability related to transmit antennas and the available resources (e.g., power, processing units, memory resources, etc.).

Based on the set of expected uplink time resources for the wireless device 14-2 on F1 and/or the set of expected downlink time resources for the wireless device 14-2 on F1, the LPN 12-2 determines and sends, to the wireless device 14-2, a set of time resources on F2 in which the wireless device 14-2 will not be scheduled for downlink reception on F2 (step 106B). Optionally, the LPN 12-2 may also utilize the information regarding the set of uplink precoding vectors and/or receive beamforming parameters to be used by the wireless device 14-2 on the expected time resources on F1 when determining the set of time resources in which the wireless device 14-2 will not be scheduled for downlink transmission on F2. The manner in which the LPN 12-2 determines the set of time resources in which the wireless device 14-2 will not be scheduled for downlink reception on F2 depends on the particular embodiment and, in particular, on the particular simultaneous transmission and/or reception scenario that is to be avoided. For example, if simultaneous transmission on F1 and F2, simultaneous reception on F1 and F2, and simultaneous transmission on F1 and reception on F2 are to be avoided, then the LPN 12-2 may determine the set of time resources in which the wireless device 14-2 will not be scheduled for downlink reception on F2 such that these scenarios are avoided. In particular, the LPN 12-2 will decide that the set of time resources in which the wireless device 14-2 will not be scheduled for downlink reception on F2 includes any time resources in which the wireless device 14-2 is expected to be scheduled for downlink reception on F1 or uplink transmission on F1.

The agreement on step 106 between the wireless device 14-2 and the LPN 12-2 is to the set of time resources in which the LPN 12-2 will not transmit downlink data to the wireless device 14-2 on F2. This helps the wireless device 14-2 to avoid simultaneous downlink reception on F2 and one or both of downlink reception on F1 and uplink transmission on F1. In addition, by knowing which time resources are expected to be used for downlink and/or uplink on F1 and by knowing which time resources will not be used for downlink on F2, this helps the wireless device 14-2 to avoid uplink transmissions on F2 in certain time resources. For example, the wireless device 14-2 may operate such that those time resources used for downlink transmission on F1 are not used for uplink transmission on F2.

Step 106 may also include signaling between the wireless device 14-2 and the LPN 12-2 regarding certain restrictions on uplink precoding vectors for upcoming uplink transmissions (step 106C). For example, the wireless device 14-2 and the LPN 12-2 may agree on the wireless device 14-2 using a single antenna reception (no receive beamforming) in a number of upcoming time resources on F2 (e.g., the next N frames or in frames with specific SFN). This helps the LPN 12-2 select a precoder and transmit power which is applicable towards a single antenna wireless device.

Optionally, based on the information obtained by the wireless device 14-2 in steps 104 and 106, the wireless device 14-2 decides, or determines, a set of suitable time resources for uplink transmission by the wireless device 14-2 on F2 (step 108). As discussed above, in some embodiments, the wireless device 14-2 performs autonomous uplink transmission on F2, where the uplink transmission is subject to LBT. Thus, by using the information obtained in steps 104 and 106, the wireless device 14-2 is able to determine a set of time resources in which the wireless device 14-2 can transmit on the uplink on F2 while avoiding the problematic simultaneous transmission and/or reception scenarios on F1 and F2. For example, if simultaneous uplink transmission on both F1 and F2 is problematic (e.g., not supported by the wireless device 14-2), then the wireless device 14-2 uses the information obtained in steps 104 and 106 to determine time resources in which the wireless device 14-2 may be able to transmit on F2, subject to LBT.

Optionally, the wireless device 14-2 communicates with the HPN 12-1 to agree on or otherwise obtain a set of time resources in which the wireless device 14-2 will not transmit in the uplink on F2 and/or a set of time resources in which uplink transmission beamforming on F2 is limited (step 110). This may be particularly beneficial where transmitting in the uplink on F2 and receiving in the downlink on F1 is problematic. In some embodiments, the wireless device 14-2 and the HPN 12-1 agree on a set of time resources in which the wireless device 14-2 will not transmit on the uplink to the LPN 12-2 on F2. This may, for example, further limit the set of permissible time resources for uplink transmission by the wireless device 14-2 on F2 determined in step 108. In addition or alternatively, the wireless device 14-2 and the HPN 12-1 agree on a set of time resources that may include uplink transmissions from the wireless device 14-2 to the LPN 12-2 but in which there will be limitations on uplink transmission beamforming (e.g., no beamforming or beamforming using only a certain subset of all available uplink precoding vectors) and/or transmit power. The HPN 12-1 can signal information about time resources (e.g., broadcast information about certain time slots) in which it will avoid uplink scheduling or can apply uplink scheduling in which the wireless device 14-2 needs to use transmit beamforming. In other words, the HPN 12-1 can send information to the wireless device 14-2 regarding time resources (e.g., subframes or time slots) in which the HPN 12-1 "promises" that the wireless device 14-2 will not have to use its uplink transmit capabilities to send data to the HPN 12-1. This information allows the wireless device 14-2 to know when it is capable to use its transmit resources to transmit toward the LPN 12-2 on F2. That is, if the wireless device 14-2 gets such information from the HPN 12-1, the wireless device 14-2 knows when it's capability can be fully used toward the LPN 12-2. This information can come periodically (e.g., prior to next time that step 110 is executed).

Optionally, the HPN 12-1 and the LPN 12-2 can communicate with one another (e.g., via X2 or similar interface) to agree on disjunct downlink time resources for the wireless device 14-2 (step 112). In other words, the HPN 12-1 and the LPN 12-2 agree on time resources that will be used for downlink from the HPN 12-1 to the wireless device 14-2 and separate time resources that will be used for downlink from the LPN 12-1 to the wireless device 14-2. In the illustrated example, the HPN 12-1 reserves time resources for downlink transmission to the wireless device 14-2 on F1 (step 112A), and the LPN 12-2 reserves time resources for downlink transmission to the wireless device 14-2 on F2 (step 112B).

In such disjunct downlink time resources, the wireless device 14-2 can use its full receive beamforming capabilities. For example, if the wireless device 14-2 is equipped with four receive antennas, the wireless device 14-2 can use all four receive antennas for downlink reception (e.g., maximum ratio combining based receive diversity using four antennas). This signaling between the HPN 12-1 and the LPN 12-2 can also be standardized. The amount of disjunct downlink time resources (e.g., L1 out of M1 downlink subframes) can be determined based on one or more criteria. Examples of criteria are downlink data buffer size, number of receive antennas at the wireless device 14-2, downlink carrier frequency, etc. For example, if the downlink buffer size is above a predefined or preconfigured threshold, then the value of L1 is configured larger than a predefined or preconfigured threshold.

Optionally, the HPN 12-1 and the LPN 12-2 can communicate with one another (e.g., via X2 or similar interface) to agree on disjunct uplink time resources for the wireless device 14-2 (step 114). In other words, the HPN 12-1 and the LPN 12-2 agree on time resources that will be used for uplink from the wireless device 14-2 to the HPN 12-1 and separate time resources that will be used for uplink from the wireless device 14-2 to the LPN 12-2. Note that the uplink from the wireless device 14-2 to the LPN 12-2 may not be fully autonomous. For example, the LPN 12-2 can, in some embodiments, use control signaling to indicate the time resources in which the wireless device 14-2 should not initiate a transmission or time resources in which the wireless device 14-2 should advantageously initiate uplink transmission. Ultimately, the wireless device 14-2 makes a decision on which to attempt uplink transmission, but the wireless device 14-2 can take into account information from the LPN 12-2 in this decision. This information from the LPN 12-2 may include information regarding the separate resources to be used for the uplink from the wireless device 14-2 to the LPN 12-2, as agreed upon in step 114. In the illustrated example, the HPN 12-1 reserves time resources for uplink transmission from the wireless device 14-2 on F1 (step 114A), and the LPN 12-2 reserves time resources for uplink transmission from the wireless device 14-2 on F2 (step 114B).

In such disjunct uplink time resources, the wireless device 14-2 can use its full transmit beamforming capabilities. For example, if the wireless device 14-2 is equipped with four transmit antennas, the wireless device 14-2 can use all four transmit antennas for uplink transmission, e.g., with precoding vectors from a code book that use all four antennas or non-code-book based beamforming that uses all four antennas. This signaling between the HPN 12-1 and the LPN 12-2 can also be standardized. The amount of disjunct uplink time resources (e.g., L2 out of M2 uplink subframes) can be determined based on one or more criteria such as, for example, uplink data buffer size, number of transmit antennas at the wireless device 14-2, uplink carrier frequency, maximum transmit power of the wireless device 14-2, available transmit power at the wireless device 14-2, etc. For example, if the uplink buffer size is larger than a predefined or preconfigured threshold and the uplink carrier frequency is in range of mmWave (e.g., 30 GHz or higher), then L2 is larger than a predefined or preconfigured threshold.

In some embodiments, the wireless device 14-2 desires to transmit on the uplink to the HPN 12-1 on F1 and, as such, the wireless device 14-2 sends an uplink scheduling request to the HPN 12-1 (step 116). The HPN 12-1 schedules an uplink transmission for the wireless device 14-2 on F1 in a time resource(s) that is suitable for an uplink transmission on F1 (step 118). Here, a suitable uplink time resource(s) is a time resource(s) that the HPN 12-1 determines is appropriate for uplink transmission from the wireless device 14-2 to the HPN 12-1 on F1 based on the information collected by the HPN 12-1 in the procedure above. For example, the suitable uplink time resource(s) is a time resource(s) that is included in the set of expected uplink time resources communicated to the wireless device 14-2 in step 104. Thus, in other words, the suitable uplink time resource(s) is a time resource in which the protocol, radio frequency, and baseband independency, taking into account the capability constraints of the wireless device 14-2 are eliminated. In embodiments where the HPN 12-1 has communicated with the LPN 12-2 to reserve uplink time resources, the suitable time resource(s) may additionally or alternatively be a reserved time resource(s). Once the uplink transmission is scheduled, the HPN 12-1 sends an uplink scheduling grant to the wireless device 14-2 for transmission on F1 in the scheduled time resource(s) (step 120). The wireless device 14-2 then transmits uplink data on F1 in the scheduled time resource(s) in accordance with the grant (step 122).

In some embodiments, the LPN 12-2 desires to transmit downlink data to the wireless device 14-2. As such, the LPN 12-2 performs an LBT procedure to determine whether the LPN 12-2 can transmit a downlink data transmission to the wireless device 14-2 on F2 in a suitable downlink time resource(s) (step 124). Here, a suitable downlink time resource(s) is a time resource(s) that the LPN 12-2 determines is appropriate for downlink transmission to the wireless device 14-2 from the LPN 12-2 on F2 based on the information collected by the LPN 12-2 in the procedure above. For example, the suitable downlink time resource(s) is a time resource(s) other than those that the LPN 12-1 previously indicated as time resources that would not be used for downlink transmission to the wireless device 14-2 on F2 in step 106. In addition, the time resource(s) may be a time resource(s) that was reserved for downlink transmission to the wireless device 14-2 on F2 in step 112. Thus, in other words, the suitable downlink time resource(s) is a time resource in which the protocol, radio frequency, and baseband independency, taking into account the capability constraints of the wireless device 14-2 are eliminated. In this example, the result of the LBT procedure is that the channel is clear for transmission. As such, the LPN 12-2 transmits a downlink data transmission to the wireless device 14-2 on F2 in the suitable downlink time resource(s) (step 126).

In some embodiments, the wireless device 14-2 desires to transmit uplink control information on F2. As such, the wireless device 14-2 performs an LBT procedure for uplink transmission on F2 in a suitable uplink time resource(s) (step 128). Here, a suitable uplink time resource(s) is a time resource(s) that the wireless device 14-2 determines is appropriate for uplink transmission from the wireless device 14-2 to the LPN 12-2 on F2 based on the information collected by the wireless device 14-2 in the procedure above. For example, in some embodiments, the suitable uplink time resource(s) is a time resource(s) from the set of suitable uplink time resources determined by the wireless device 14-2 in step 108. Thus, in other words, the suitable uplink time resource(s) is a time resource in which the protocol, radio frequency, and baseband independency, taking into account the capability constraints of the wireless device 14-2 are eliminated. In this example, the LBT procedure determines that the channel is clear. As such, the wireless device 14-2 transmits an uplink control information transmission on F2 in the suitable uplink time resource(s) (step 130).

Figure 3A:
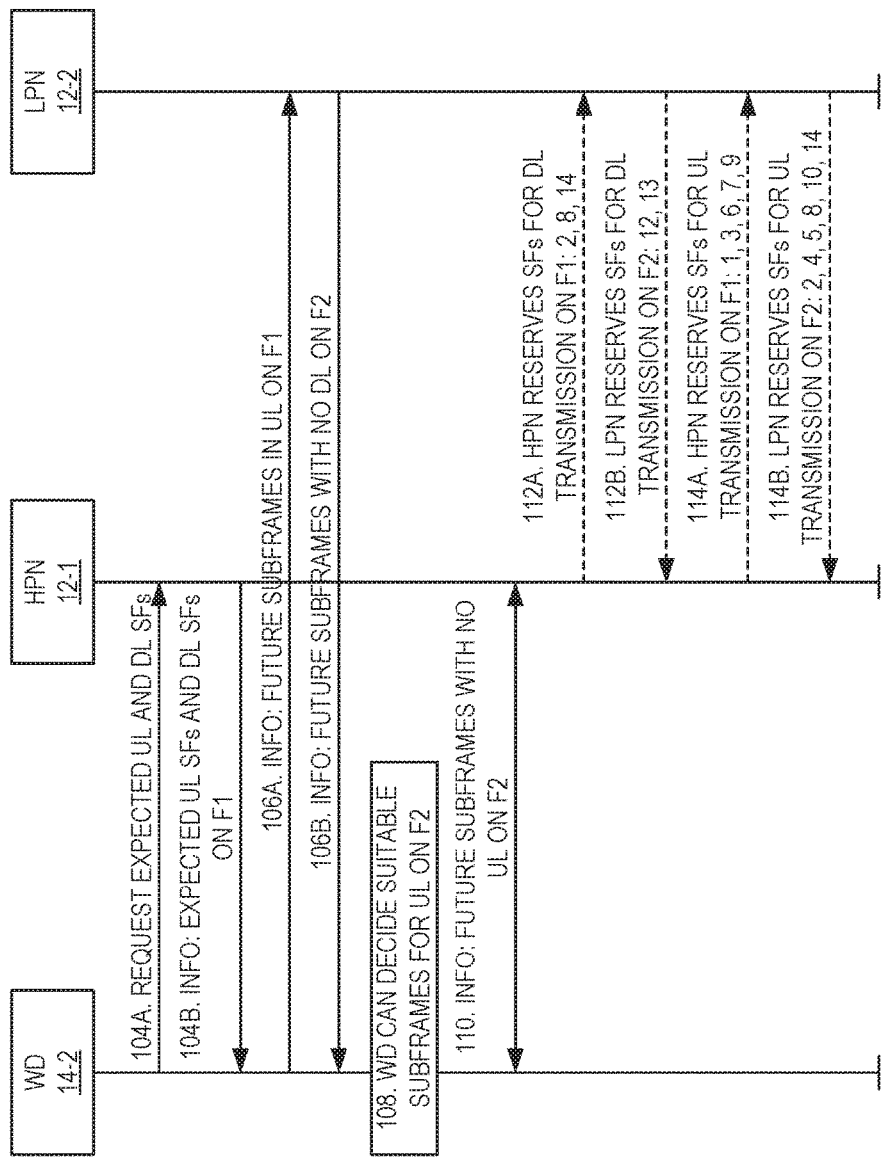
Figure 3B:
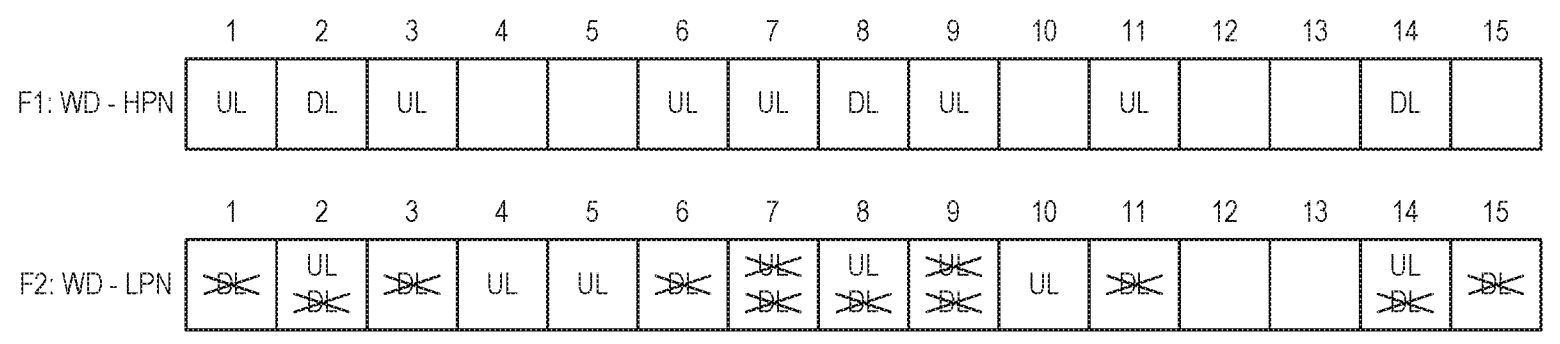

FIGS. 3A and 3B illustrate one example of the process of FIGS. 2A through 2C. In this example, the assumptions are that the wireless device 14-2 does not support simultaneous uplink transmissions on F1 and F2, does not support simultaneous downlink reception on F1 and F2, does not support simultaneous uplink transmission on F1 and downlink reception on F2, and does support simultaneous downlink reception on F1 and uplink transmission on F2.

As illustrated, the wireless device 14-2 sends a request to the HPN 12-1 for an expected set of uplink subframes for the wireless device 14-2 on F1 and an expected set of downlink subframes for the wireless device 14-2 on F1 (step 104A). The HPN 12-1 returns a set expected uplink subframes for the wireless device 14-2 on F1 and a set of expected downlink subframes for the wireless device 14-2 on F1 (step 104B). In this example, as illustrated in FIG. 3B, the expected set of uplink subframes is subframes 1, 3, 6, 7, 9, and 11, and the expected set of downlink subframes is subframes 2, 8, and 14.

The wireless device 14-2 sends the expected set of uplink subframes on F1 to the LPN 12-2 (step 106A). In response, the LPN 12-2 returns, to the wireless device 14-2, a set of subframes that will not be used for downlink transmission to the wireless device 14-2 on F2 (step 106B). As illustrated in FIG. 3B, the set of subframes that will not be used for downlink transmission to the wireless device 14-2 on F2 is subframes 1, 2, 3, 6, 7, 8, 9, 11, 14, and 15. Here, the set of subframes that will not be used for downlink transmission to the wireless device 14-2 on F2 include: (a) subframes in which downlink transmissions to the wireless device 14-2 are expected on F1 since simultaneous downlink reception on both F1 and F2 is not supported by the wireless device 14-2 in this example, (b) subframes in which uplink transmissions from the wireless device 14-2 to the HPN 12-1 are expected on F1 since simultaneous downlink reception on F2 and uplink transmission on F1 is not supported by the wireless device 14-2 in this example, and (c) some additional subframes determined by the LPN 12-2 based on some additional criteria (optional). For example, regarding (c), subframe 15 may be included in the list because an empty subframe 15 gives the possibility to the wireless device 14-2 to, for example, perform carrier sensing, reference signal measurements on reference signals either from the HPN 12-1 or the LPN 12-2, or transmit an ACK/NACK signal either to the HPN 12-1 or the LPN 12-2. For future proofness, an empty subframe can be reserved for future usage. Some devices may also require a guard subframe when switching from downlink reception on one carrier to uplink transmission on another carrier. It can also be useful to create such an empty subframe for the purpose of creating an interference free subframe for other surrounding nodes.

The wireless device 14-2 decides, or determines, a set of subframes that are suitable for uplink transmission from the wireless device 14-2 on F2 based on the information obtained in the previous steps (step 108). In this example, the wireless device 14-2 determines that subframes 2, 4, 5, 8, 10, and 14 are suitable for uplink on F2. More specifically, based on the information obtained in the previous steps and the knowledge that the wireless device 14-2 does not support simultaneous uplink transmissions on F1 and F2 and does support simultaneous downlink reception on F1 and uplink transmission on F2, the wireless device 14-2 is able to identify the subframes 2, 4, 5, 8, 10, and 14 as being suitable for uplink transmission on F2, in this example.

The wireless device 14-2 and the HPN 12-1 agree on future subframes in which there will be no uplink transmissions by the wireless device 14-2 on F2 (step 110). In this example, the wireless device 14-2 and the HPN 12-1 agree that there will be no uplink transmissions by the wireless device 14-2 in subframes 7 and 9. More specifically, the wireless device 14-2 and the HPN 12-1 need to know in advance the subframes that are available for uplink transmission on F1. For this reason, there must be subframes in which it is a priori agreed that there will not be uplink transmission on F2. This creates subframes that are available for uplink transmission on F1, so it creates the possibility to choose a good subframe for uplink transmission on F1. In this context, a "good" subframe is a subframe in which the channel conditions are good, and the HPN 12-1 would schedule the wireless device 14-2 if was not connected simultaneously to another radio access node as well. Within these constraints, subframes 7 and 9 are chosen arbitrarily in this example.

In the optional steps 112A and 112B, the HPN 12-1 and the LPN 12-2 reserve subframes 2, 8, and 14 for downlink transmission on F1 and subframes 12 and 13 for downlink transmission on F2. Similarly, in the optional steps 114A and 114B, the HPN 12-1 and the LPN 12-2 reserve subframes 1, 3, 6, 7, and 9 for uplink transmission on F1 and subframes 2, 4, 5, 8, 10, and 14 for uplink transmission on F2.

Figure 4:
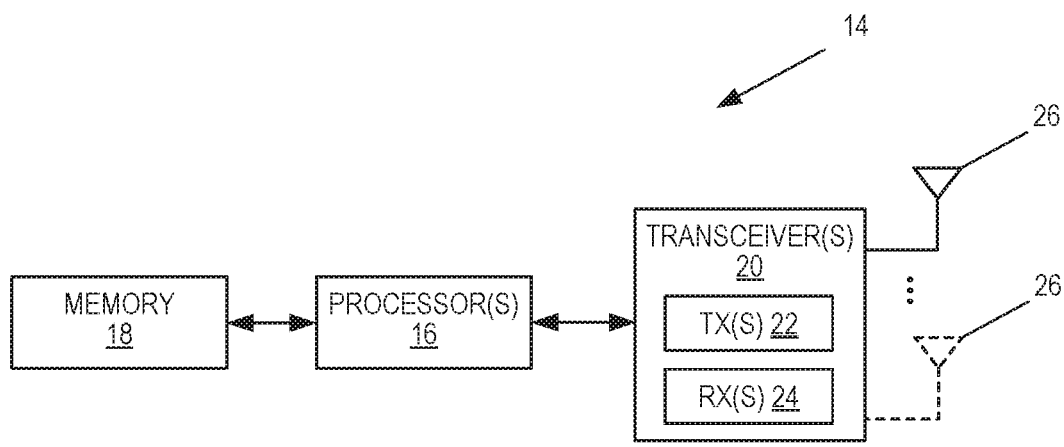
FIGS. 4 and 5 illustrate example embodiments of a wireless device.

FIG. 4 is a schematic block diagram of the wireless device 14 such as, for example, the wireless device 14-2 discussed above according to some embodiments of the present disclosure. As illustrated, the wireless device 14 includes circuitry comprising one or more processors 16 (e.g., Central Processing Units (CPUs), Application Specific Integrated Circuits (ASICs), Field Programmable Gate Arrays (FPGAs), and/or the like) and memory 18. The wireless device 14 also includes one or more transceivers 20 each including one or more transmitters 22 and one or more receivers 24 coupled to one or more antennas 26. In some embodiments, the functionality of the wireless device 14 described above may be fully or partially implemented in software that is, e.g., stored in the memory 18 and executed by the processor(s) 16.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 5:
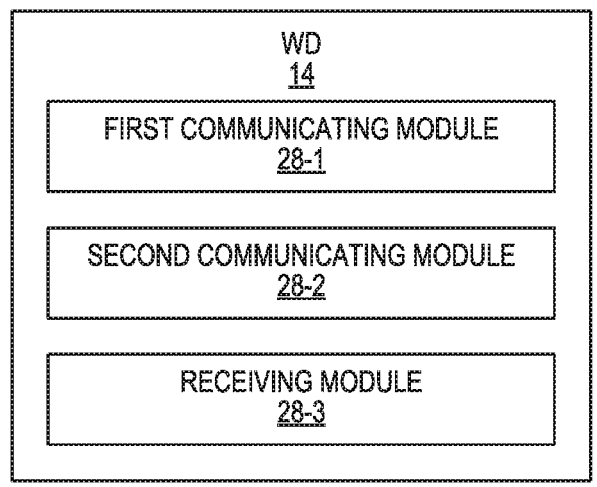

FIG. 5 is a schematic block diagram of the wireless device 14 according to some other embodiments of the present disclosure. The wireless device 14 includes one or more modules 28, each of which is implemented in software. The module(s) 28 provide the functionality of the wireless device 14 described herein. In this example, the modules 28 include a first communicating module 28-1, a second communicating module 28-2, and a receiving module 28-3. The first communicating module 28-1 is for communicating with a first radio node (e.g., the HPN 12-1) that operates on a first carrier frequency in a licensed band to obtain a set of time resources in which the wireless device 14 is expected to be scheduled for uplink data transmission on the first carrier frequency and/or a set of time resources in which the wireless device 14 is expected to receive downlink control transmission on the first carrier frequency. The second communicating module 28-2 is for communicating with a second radio node (e.g., the LPN 12-2) that operates on a second carrier frequency in an unlicensed band to obtain, based on the set of time resources in which the wireless device 14 is expected to be scheduled for uplink data transmission on the first carrier frequency and/or the set of time resources in which the wireless device 14 is expected to receive downlink control transmission on the first carrier frequency, a set of time resources in which the wireless device 14 will not be scheduled for downlink reception on the second carrier frequency. The receiving module 28-3 is for receiving a downlink data transmission from the second radio node (e.g., the LPN 12-2) on the second carrier frequency in a time resource that is not in the set of time resources in which the wireless device 14 will not be scheduled for downlink reception on the second carrier frequency.

Figure 6:
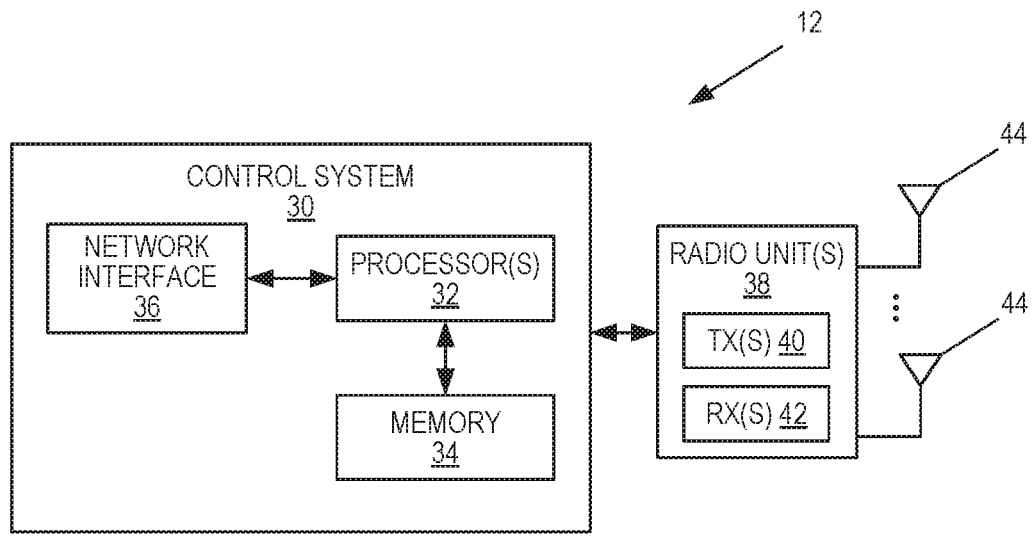
FIGS. 6 through 8 illustrate example embodiments of a radio access node.

FIG. 6 is a schematic block diagram of a radio access node 12 (e.g., the HPN 12-1 or the LPN 12-2) according to some embodiments of the present disclosure. As illustrated, the radio access node 12 includes a control system 30 that includes circuitry comprising one or more processors 32 (e.g., CPUs, ASICs, FPGAs, and/or the like) and memory 34. The control system 40 also includes a network interface 36. This network interface 36 is implemented in hardware or a combination of hardware and software and provides an interface to one or more transport networks (e.g., an IP network) over which the radio access node 12 communicates with other radio access nodes 12 (e.g., via an X2 interface(s)) established over the transport network(s)) and/or with a core network (e.g., via a S1 interface established over the transport network(s)). The radio access node 12 also includes one or more radio units 38 that each include one or more transmitters 40 and one or more receivers 42 coupled to multiple antennas 44. In some embodiments, the functionality of the radio access node 12 (e.g., the functionality of the HPN 12-1 or the functionality of the LPN 12-2) described above may be fully or partially implemented in software that is, e.g., stored in the memory 34 and executed by the processor(s) 32.

Figure 7:
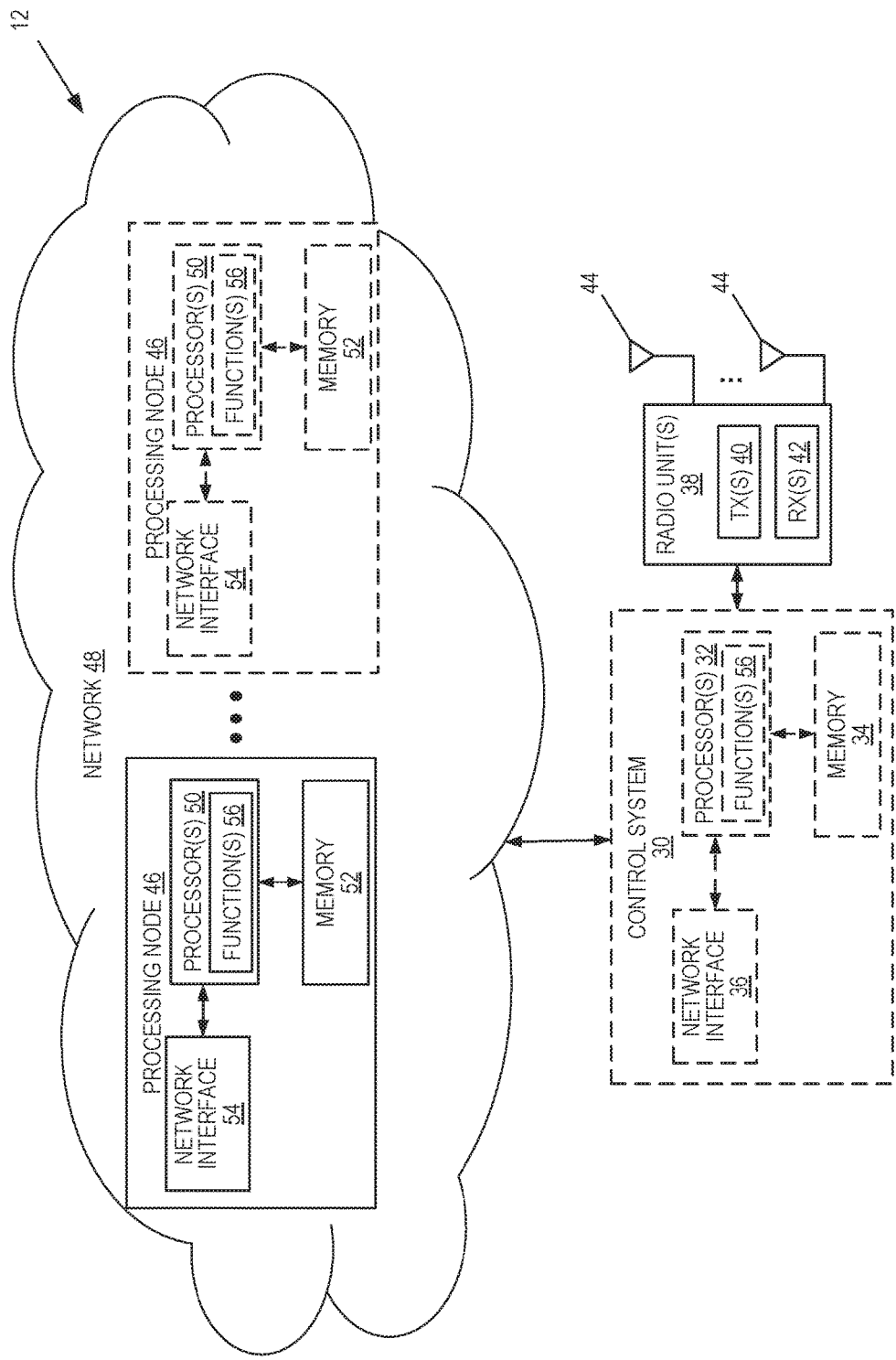

FIG. 7 is a schematic block diagram that illustrates a virtualized embodiment of the radio access node 12 (e.g., the HPN 12-1 or the LPN 12-2) according to some embodiments of the present disclosure. As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 includes the radio unit(s) 38 and optionally includes the control system 30, as described with respect to FIG. 6. The control system 30 (if present) is connected to one or more processing nodes 46 coupled to or included as part of a network(s) 48 via the network interface 36. Alternatively, if the control system 30 is not present, the one or more radio units 38 are connected to the one or more processing nodes 46 via a network interface(s). Each processing node 46 includes one or more processors 50 (e.g., CPUs, ASICs, FPGAs, and/or the like), memory 52, and a network interface 54.

In this example, functions 56 of the radio access node 12 described herein are implemented at the one or more processing nodes 46 or distributed across the control system 30 (if present) and the one or more processing nodes 46 in any desired manner. In some particular embodiments, some or all of the functions 56 of the radio access node 12 described herein are implemented as virtual components executed by one or more virtual machines implemented in a virtual environment(s) hosted by the processing node(s) 46. As will be appreciated by one of ordinary skill in the art, additional signaling or communication between the processing node(s) 46 and the control system 30 (if present) or alternatively the radio unit(s) 38 is used in order to carry out at least some of the desired functions. Notably, in some embodiments, the control system 30 may not be included, in which case the radio unit(s) 38 communicates directly with the processing node(s) 46 via an appropriate network interface(s).

In some embodiments, a computer program including instructions which, when executed by at least one processor, causes the at least one processor to carry out the functionality of the radio access node 12 (e.g., the HPN 12-1 or the LPN 12-2) or a processing node 46 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
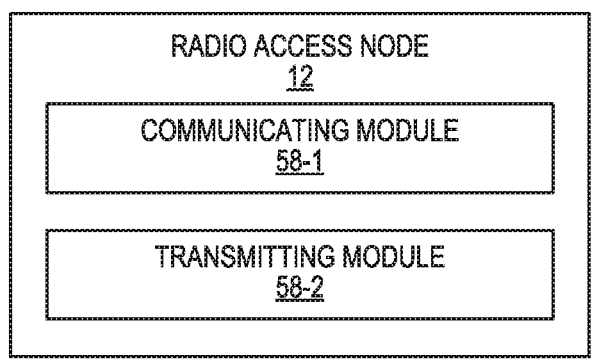

FIG. 8 is a schematic block diagram of the radio access node 12 (e.g., the HPN 12-1 or the LPN 12-2) according to some other embodiments of the present disclosure. The radio access node 12 includes one or more modules 58, each of which is implemented in software. The module(s) 58 provide the functionality of the radio access node 12 described herein. In this example, the modules 58 include a communicating module 58-1 and a transmitting module 58-2. The communicating module 58-1 is for communicating with a wireless device 14 to agree, based on a set of time resources in which the wireless device 14 is expected to be scheduled for uplink data transmission to another radio node (e.g., the HPN 12-1) on a first carrier frequency in a licensed band and/or a set of time resources in which the wireless device 14 is expected to receive downlink control transmission on the first carrier frequency, a set of time resources in which the wireless device 14 will not be scheduled for downlink reception from the radio access node 12 (e.g., the LPN 12-2) on a second carrier frequency in an unlicensed band. The transmitting module 58-2 is for transmitting (i.e., transmitting via the radio unit(s) 38 or initiating or effecting transmission by the radio unit(s) 38) a downlink data transmission to the wireless device 14 on the second carrier frequency in a time resource that is not in the set of time resources in which the wireless device 14 will not be scheduled for downlink reception on the second carrier frequency.

Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device to provide decoupling of downlink reception and uplink transmission in a mixed licensed carrier and unlicensed carrier wireless communications system, comprising:
   communicating with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency;
   communicating with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency; and
   receiving a downlink data transmission from the second radio node on the second carrier frequency in a time resource that is not in the set of time resources in which the wireless device will not be scheduled for downlink reception on the second carrier frequency.

2. The method of claim 1 further comprising:
   deciding, based on the set of time resources in which the wireless device is expected to be scheduled for uplink data transmission on the first carrier frequency and the set of time resources in which the wireless device will not be scheduled for downlink reception on the second carrier frequency, one or more suitable time resources for uplink control transmission on the second carrier frequency; and
   transmitting, subject to a listen-before-talk procedure, an uplink control transmission on the second carrier frequency in at least one of the one or more suitable time resources for uplink control transmission on the second carrier frequency.

3. The method of claim 1 wherein the set of time resources in which the wireless device is expected to be scheduled for uplink data transmission on the first carrier frequency is a set of subframes in which the wireless device is expected to be scheduled for uplink data transmission on the first carrier frequency, and communicating with the first radio node comprises:
   receiving, from the first radio node, a frame number and/or a subframe number that identifies each subframe of the set of subframes in which the wireless device is expected to be scheduled for uplink data transmission on the first carrier frequency.

4. The method of claim 1 wherein:
   communicating with the first radio node comprises obtaining, from the first radio node, a set of uplink precoding vectors and receive beamforming parameters expected to be used in the set of time resources in which the wireless device is expected to be scheduled for uplink data transmission on the first carrier frequency;
   wherein communicating with the second radio node that operates on the second carrier frequency in the unlicensed band to obtain the set of time resources in which the wireless device will not be scheduled for downlink reception on the second carrier frequency is further based on the set of uplink precoding vectors and/or receive beamforming parameters expected to be used in the set of time resources in which the wireless device is expected to be scheduled for uplink data transmission on the first carrier frequency.

5. The method of claim 1 wherein communicating with the second radio node that operates on the second carrier frequency in the unlicensed band to obtain the set of time resources in which the wireless device will not be scheduled for downlink reception on the second carrier frequency comprises:
   sending, to the second radio node, the set of time resources in which the wireless device is expected to be scheduled for uplink data transmission on the first carrier frequency and/or the set of time resources in which the wireless device is expected to receive downlink control transmission on the first carrier frequency; and
   receiving, from the second radio node, the set of time resources in which the wireless device will not be scheduled for downlink reception on the second carrier frequency.

6. The method of claim 1 further comprising:
   communicating with the first radio node to agree on a set of time resources in which there will be no uplink transmission from the wireless device on the second carrier frequency.

7. The method of claim 1 further comprising:
communicating with the first radio node to agree on a set of time resources in which beamforming for uplink transmission from the wireless device on the second carrier frequency is limited.

8. The method of claim 1 wherein:
the set of time resources in which the wireless device is expected to be scheduled for uplink data transmission on the first carrier frequency is a set of subframes, a set of time slots, a set of symbols, or a set of transmission time intervals;
the set of time resources in which the wireless device is expected to receive downlink control transmission on the first carrier frequency is a set of subframes, a set of time slots, a set of symbols, or a set of transmission time intervals; and/or
the set of time resources in which the wireless device will not be scheduled for downlink reception on the second carrier frequency is a set of subframes, a set of time slots, a set of symbols, or a set of transmission time intervals.

9. The method of claim 1 wherein:
the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than a delay between an uplink grant and a corresponding uplink transmission on the first carrier frequency; and/or
the set of time resources in which the wireless device is expected to receive downlink control transmission on the first carrier frequency is a set of time resources in which the wireless device is expected to receive downlink control transmission on the first carrier frequency over a future period of time that is greater than a delay between an uplink grant and a corresponding uplink transmission on the first carrier frequency.

10. The method of claim 1 wherein:
the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than or equal to at least one radio frame; and/or
the set of time resources in which the wireless device is expected to receive downlink control transmission on the first carrier frequency is a set of time resources in which the wireless device is expected to receive downlink control transmission on the first carrier frequency over a future period of time that is greater than or equal to at least one radio frame.

11. A wireless device for providing decoupling of downlink reception and uplink transmission in a mixed licensed carrier and unlicensed carrier wireless communications system, comprising:
a transceiver;
at least one processor; and
memory comprising instructions executable by the at least one processor whereby the wireless device is operable to:
communicate with a first radio node that operates on a first carrier frequency in a licensed band to obtain a set of time resources in which the wireless device is expected to be scheduled for uplink data transmission on the first carrier frequency and/or a set of time resources in which the wireless device is expected to receive downlink control transmission on the first carrier frequency;
communicate with a second radio node that operates on a second carrier frequency in an unlicensed band to obtain, based on the set of time resources in which the wireless device is expected to be scheduled for uplink data transmission on the first carrier frequency and/or the set of time resources in which the wireless device is expected to receive downlink control transmission on the first carrier frequency, a set of time resources in which the wireless device will not be scheduled for downlink reception on the second carrier frequency; and
receive a downlink data transmission from the second radio node on the second carrier frequency in a time resource that is not in the set of time resources in which the wireless device will not be scheduled for downlink reception on the second carrier frequency.

12. A method of operation of a radio node to provide decoupling of downlink reception and uplink transmission in a mixed licensed carrier and unlicensed carrier wireless communications system, comprising:
communicating with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band; and
transmitting a downlink data transmission to the wireless device on the second carrier frequency in a time resource that is not in the set of time resources in which the wireless device will not be scheduled for downlink reception on the second carrier frequency.

13. The method of claim 12 wherein communicating with the wireless device comprises:
receiving, from the wireless device, the set of time resources in which the wireless device is expected to be scheduled for uplink data transmission on the first carrier frequency and/or the set of time resources in which the wireless device is expected to receive downlink control transmission on the first carrier frequency; and
sending, to the wireless device, the set of time resources in which the wireless device will not be scheduled for downlink reception on the second carrier frequency.

14. The method of claim 12 further comprising communicating with the other radio node regarding time resources reserved for downlink transmission on the first carrier frequency and/or time resources reserved for downlink transmission on the second carrier frequency.

15. The method of claim 12 further comprising communicating with the other radio node regarding time resources reserved for uplink transmission on the first carrier frequency and/or time resources reserved for uplink transmission on the second carrier frequency.

16. The method of claim 12 wherein:
the set of time resources in which the wireless device is expected to be scheduled for uplink data transmission on the first carrier frequency is a set of subframes, a set of time slots, a set of symbols, or a set of transmission time intervals;

the set of time resources in which the wireless device is expected to receive downlink control transmission on the first carrier frequency is a set of subframes, a set of time slots, a set of symbols, or a set of transmission time intervals; and/or the set of time resources in which the wireless device will not be scheduled for downlink reception on the second carrier frequency is a set of subframes, a set of time slots, a set of symbols, or a set of transmission time intervals.

17. The method of claim 12 wherein:

the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than a delay between an uplink grant and a corresponding uplink transmission on the first carrier frequency; and/or the set of time resources in which the wireless device is expected to receive downlink control transmission on the first carrier frequency is a set of time resources in which the wireless device is expected to receive downlink control transmission on the first carrier frequency over a future period of time that is greater than a delay between an uplink grant and a corresponding uplink transmission on the first carrier frequency.

18. The method of claim 12 wherein:

the set of time resources in which the wireless device is expected to be scheduled for uplink data transmission on the first carrier frequency is a set of time resources in which the wireless device is expected to be scheduled for uplink data transmission on the first carrier frequency over a future period of time that is greater than or equal to at least one radio frame; and/or the set of time resources in which the wireless device is expected to receive downlink control transmission on the first carrier frequency is a set of time resources in which the wireless device is expected to receive downlink control transmission on the first carrier frequency over a future period of time that is greater than or equal to at least one radio frame.

19. A radio node for providing decoupling of downlink reception and uplink transmission in a mixed licensed carrier and unlicensed carrier wireless communications system, comprising:

at least one processor; and memory comprising instructions executable by the at least one processor whereby the radio node is operable to:

communicate with a wireless device to agree, based on a set of time resources in which the wireless device is expected to be scheduled for uplink data transmission to another radio node on a first carrier frequency in a licensed band and/or a set of time resources in which the wireless device is expected to receive downlink control transmission on the first carrier frequency, a set of time resources in which the wireless device will not be scheduled for downlink reception from the radio node on a second carrier frequency in an unlicensed band; and transmit a downlink data transmission to the wireless device on the second carrier frequency in a time resource that is not in the set of time resources in which the wireless device will not be scheduled for downlink reception on the second carrier frequency.

* * * * *